United States Patent
Yagi et al.

(10) Patent No.: US 7,825,599 B2
(45) Date of Patent: Nov. 2, 2010

(54) LIGHTING CONTROL APPARATUS OF VEHICLE-PURPOSE LIGHTING DEVICE

(75) Inventors: Seiichiro Yagi, Shizuoka (JP); Hiroyuki Ishida, Shizuoka (JP); Masayasu Ito, Shizuoka (JP); Yoshihiro Uchiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 658 days.

(21) Appl. No.: 11/489,395

(22) Filed: Jul. 19, 2006

(65) Prior Publication Data

US 2007/0018586 A1    Jan. 25, 2007

(30) Foreign Application Priority Data

Jul. 20, 2005    (JP) .............................. 2005-209626

(51) Int. Cl.
    *B60Q 1/26* (2006.01)
(52) U.S. Cl. ..................... 315/79; 315/309; 315/247; 315/312; 315/185 S
(58) Field of Classification Search ............... 315/291, 315/307–326, 224, 225, 185 S, 200 A, 247, 315/246; 345/204, 207, 211, 212, 214, 102; 340/458, 459, 468, 469, 466, 457.2, 457.3, 340/464, 465
    See application file for complete search history.

(56) References Cited

U.S. PATENT DOCUMENTS 6,443,602 B1 * 9/2002 Tanabe et al. ............... 362/465

| 7,012,384 B2 * | 3/2006 | Tatewaki et al. ............ 315/323 |
| 2001/0012206 A1 * | 8/2001 | Hayami et al. ............... 362/464 |
| 2005/0047831 A1 * | 3/2005 | Chang et al. ................. 399/220 |
| 2005/0094414 A1 * | 5/2005 | Ishida et al. ................ 362/545 |

FOREIGN PATENT DOCUMENTS

| JP | 4-123942 | 4/1992 |
| JP | 2004-276737 | 10/2004 |

OTHER PUBLICATIONS

Japanese Office Action for patent application No. 2005-209626, mailed Nov. 18, 2009, and English translation thereof, 6 pages.
English abstract from esp@cenet.com for patent application with Publication No. JP4123942, Publication Date: Apr. 23, 1992, 1 page.

* cited by examiner

*Primary Examiner*—Tuyet Thi Vo
(74) *Attorney, Agent, or Firm*—Osha•Liang LLP (57) ABSTRACT

A lighting control apparatus of a vehicle-purpose lighting device can contribute power saving effect, and prevention of a deterioration of a semiconductor light source, and also, can maintain driving safety characteristics. When an input terminal becomes a low level while a vehicle is stopped, a PNP transistor is turned ON, so that a source current I1 flows through a current detecting terminal; a switching regulator lights an LED under beam attenuating operation of 70% in accordance with a light emitting degree capable of satisfying a luminous intensity distribution defined in a law; when an upper beam is lighted, the input terminal becomes a low level; a PNP transistor is turned ON; a source current I2 flows through the current detecting terminal, so that the light emitting degree of the LED is further decreased, and thus, the switching regulator lights the LED under beam attenuating operation of 50%.

5 Claims, 5 Drawing Sheets

LIGHTING CONTROL APPARATUS OF VEHICLE-PURPOSE LIGHTING DEVICE

BACKGROUND OF INVENTION

1. Field of the Invention

The present invention generally relates to a lighting control apparatus of a vehicle-purpose lighting device. More specifically, the present invention is directed to a lighting control apparatus of a vehicle-purpose lighting device, which is arranged in such a manner that lighting operations of a semiconductor light source constituted by a semiconductor light emitting element are controlled.

2. Background Art

Conventionally, light sources are known in which semiconductor light emitting elements such as LEDs (Light Emitting Diodes) are employed as vehicle-purpose lighting devices. In such vehicle-purpose lighting devices, lighting control apparatus for controlling lighting operations of the LEDs have been included.

When LEDs are employed as light sources of vehicle-purpose lighting devices, dimming control operations of the light sources can be carried out in an easy manner. However, when LEDs are employed as vehicle-purpose head lamps, there is a possibility that these LEDs cannot properly emit light due to increases in the temperature within the light chambers. As a consequence, it has been proposed that in the case that LEDs are employed in a light source of a vehicle-purpose lighting device, when a speed of a vehicle is decreased from a preset vehicle speed, or when a temperature of the vehicle-purpose lighting device exceeds a threshold value, the currents of these LEDs are decreased so as to suppress heat originally generated from the LEDs (refer to patent publication 1). In this case, even when the current supplied to the LEDs is decreased, the beam attenuations of these LEDs can be carried out, while the light of the LEDs does not disappear.

[Patent Publication 1] JP-A-2004-276737 (FIG. 3 and FIG. 4, pages 4 to 8)

Because heat resistant temperatures of semiconductor light sources, such as LEDs, are low, which is different from those of halogen lamps and discharge lamps, when lifetimes and deteriorations of these semiconductor light sources are considered, beam attenuating operations of the semiconductor light sources may achieve certain effects, for example, suppressions of temperature increases in the semiconductor light sources.

Further, in the case that the beams of the semiconductor light sources are attenuated, if this beam attenuation is simply performed, then energy saving effects may be achieved. However, it is practically difficult to maintain safety characteristics of the semiconductor light sources, particularly with respect to the degrees of luminous intensity distributions.

SUMMARY OF INVENTION

One or more embodiments of the present invention maintain safety characteristics of semiconductor light sources, and also to contribute prevention of deteriorations in the semiconductor light sources, and energy saving aspects in the semiconductor light sources.

In one or more embodiments, a lighting control apparatus of a vehicle-purpose lighting device comprises light amount instruction value setting means for inputting information related to either a status of a vehicle or a lighting operation of a light source and for setting a light amount instruction value in response to the content of the information; and electric power supplying means for supplying an input voltage from a power supply to a lower beam-purpose semiconductor light source in accordance with the light amount instruction value; in which when information for indicating that a vehicle speed is lower than a predetermined speed value is inputted to the light amount instruction value setting means, the light amount instruction value setting means sets such a light amount instruction value by which the lower beam-purpose semiconductor light source is lighted under beam-attenuating condition up to a light emitting degree capable of satisfying a predetermined luminous intensity distribution; and when information for indicating that an upper beam-purpose light source is lighted is input, the light amount instruction value setting means sets a light amount instruction value by that a light emitting degree is lowered than that of the beam-attenuating lighting operation so as to light the lower beam-purpose semiconductor light source under beam-attenuating condition.

At a stage that the input voltage from the power supply is supplied to the lower beam-purpose semiconductor light source in accordance with a light amount instruction value, in the case that such a light amount instruction value when the vehicle speed is lower than the predetermined speed value, the lower beam-purpose semiconductor light source is lighted under beam attenuating condition up to the predetermined luminous intensity distribution, for instance, at a light emitting degree capable of satisfying the luminous intensity distribution standard determined by the law, for example, assuming now that a full lighting operation corresponds to 100%, up to such a light emitting degree at 70% of the full lighting operation. In the case that a light amount instruction value when the upper beam-purpose light source is lighted is set, the lower beam-purpose semiconductor light source is lighted under beam attenuating condition by decreasing the light emitting degree at 70% of the beam attenuating operation, for instance, by reducing the light emitting degree up to 50% of the full lighting operation. In other words, when the vehicle speed is lower than the predetermined value, the lower beam-purpose semiconductor light source is lighted under the beam-attenuating condition at 70% of the full lighting operation, whereas when the upper beam-purpose light source is lighted, the lower beam-purpose light source is lighted under the beam-attenuating condition at 50% of the full lighting operation. As a consequence, the above-explained lighting operations of the lower beam-purpose light source can contribute the energy saving effect and the prevention of the deterioration of the lower beam-purpose light source, and the driving safety characteristics can be maintained.

In accordance with one or more embodiments, the light amount instruction value setting means includes a temperature detecting element for detecting an ambient temperature; and when a temperature detected by the temperature detecting element reaches a predetermined temperature, the light amount instruction value setting means sets a light amount instruction value used to decrease the temperature of the lower beam-purpose semiconductor light source lower than, or equal to a setting temperature, or sets a light amount instruction value used to restrict the temperature of the lower beam-purpose semiconductor light source to the setting temperature, which correspond to light amount instruction values used to reduce a light emitting degree of the lower beam-purpose semiconductor light source, and then, outputs any one of the set light amount instruction values to the electric power supplying means.

When a temperature detected by the temperature detecting element reaches a predetermined temperature, a light amount instruction value used to decrease the temperature of the lower beam-purpose semiconductor light source lower than, or equal to a setting temperature is set, or a light amount instruction value used to restrict the temperature of the lower beam-purpose semiconductor light source to the setting temperature is set, which correspond to light amount instruction values used to reduce a light emitting degree of the lower beam-purpose semiconductor light source, and then, the lower beam-purpose semiconductor light source is lighted under beam attenuating operation in accordance with any one of these light amount instruction values. As a result, while the temperature increase of the lower beam-purpose semiconductor light source can be suppressed, the deterioration of the lower beam-purpose semiconductor light source can be avoided and this can contribute the long lifetime of the LED 16.

In other words, if the lighting condition of the semiconductor light source is continued under burning sun in mid-summer time, or under idle state, there are such risks that the semiconductor light source is deteriorated and the lifetime of the semiconductor light source is adversely influenced, namely even when the semiconductor light source is lighted under beam-attenuating condition during the idle state (during vehicle stopping condition), if this condition is continued for a long time, then the above-explained risk may occur. However, even when the semiconductor light source is lighted under beam-attenuating condition, in such a case that the ambient temperature reaches the predetermined temperature, the semiconductor light source is furthermore brought into the beam-attenuating lighting condition. As a result, the temperature increase of the semiconductor light source is suppressed, so that the semiconductor light source can be protected.

In one or more embodiments, the light amount instruction value setting means sets such a light amount instruction value when the temperature detected by the temperature detecting element reaches the predetermined temperature under such a condition that the information for indicating that the vehicle speed is lower than the predetermined speed value has been set; and the light amount instruction value setting means prohibits setting of the light amount instruction amount when the temperature detected by the temperature detecting element reaches the predetermined temperature.

When the detection temperature of the temperature detecting element reaches the predetermined temperature, in the case that the semiconductor light source is lighted under beam attenuating condition, the semiconductor light source is lighted under beam attenuating condition while such a condition is established that the vehicle speed is lower than the predetermined speed value. The beam-attenuating lighting operation of the lower beam-purpose semiconductor light source is prohibited in other cases, namely when the vehicle speed becomes higher than the predetermined value, or when the vehicle is under drive status. As a consequence, when the vehicle speed becomes higher than the predetermined value, or when the vehicle is under drive status, the safety characteristics are maintained with a top priority, while the light emitting degree of the semiconductor light source is not lowered. Also, when the vehicle is driven, the temperature increase of the semiconductor light source can be suppressed to some extent due to wind produced by the travel of the vehicle.

As apparent from the above descriptions, in accordance with embodiments of the present invention, it is possible to contribute the power saving effect and the prevention as to the deterioration of the semiconductor light source, and the driving safety characteristics can be maintained.

In accordance with one or more embodiments, while the temperature increase of the semiconductor light source can be suppressed, it is possible to prevent the deterioration of the semiconductor light source, and contribute a long lifetime.

In accordance with one or more embodiments, when the vehicle speed becomes higher than the predetermined speed value, or when the vehicle is under drive condition, the driving safety characteristics can be maintained with a top priority.

Other aspects and advantages of the invention will be apparent from the following description and the appended claims.

BRIEF DESCRIPTION OF DRAWINGS

FIG. 4(a) is a luminous intensity distribution pattern of a lower beam when a light amount of an entire portion is decreased; FIG. 4(b) is a luminous intensity distribution pattern diagram containing both a lower beam and an upper beam; FIG. 4(c) is a luminous intensity distribution pattern diagram when a light amount of only right and left portions of the lower beam is decreased; and FIG. 4(d) is a luminous intensity distribution pattern diagram when a light amount of only a far portion of the lower beam is decreased.

FIG. 5(a) is a diagram for explaining a condition that a lower beam when a light amount of an entire portion is decreased is illuminated onto the road surface; FIG. 5(b) is a diagram for showing a condition that both the lower beam and an upper beam are illuminated onto the road surface; FIG. 5(c) is a diagram for representing a condition that the lower beam when a light amount of right and left portions is lowered is illuminated onto the road surface; and FIG. 5(d) is a diagram for representing a condition that the lower beam when a light amount of a far portion is lowered is illuminated onto the road surface.

DETAILED DESCRIPTION

Figure 1:
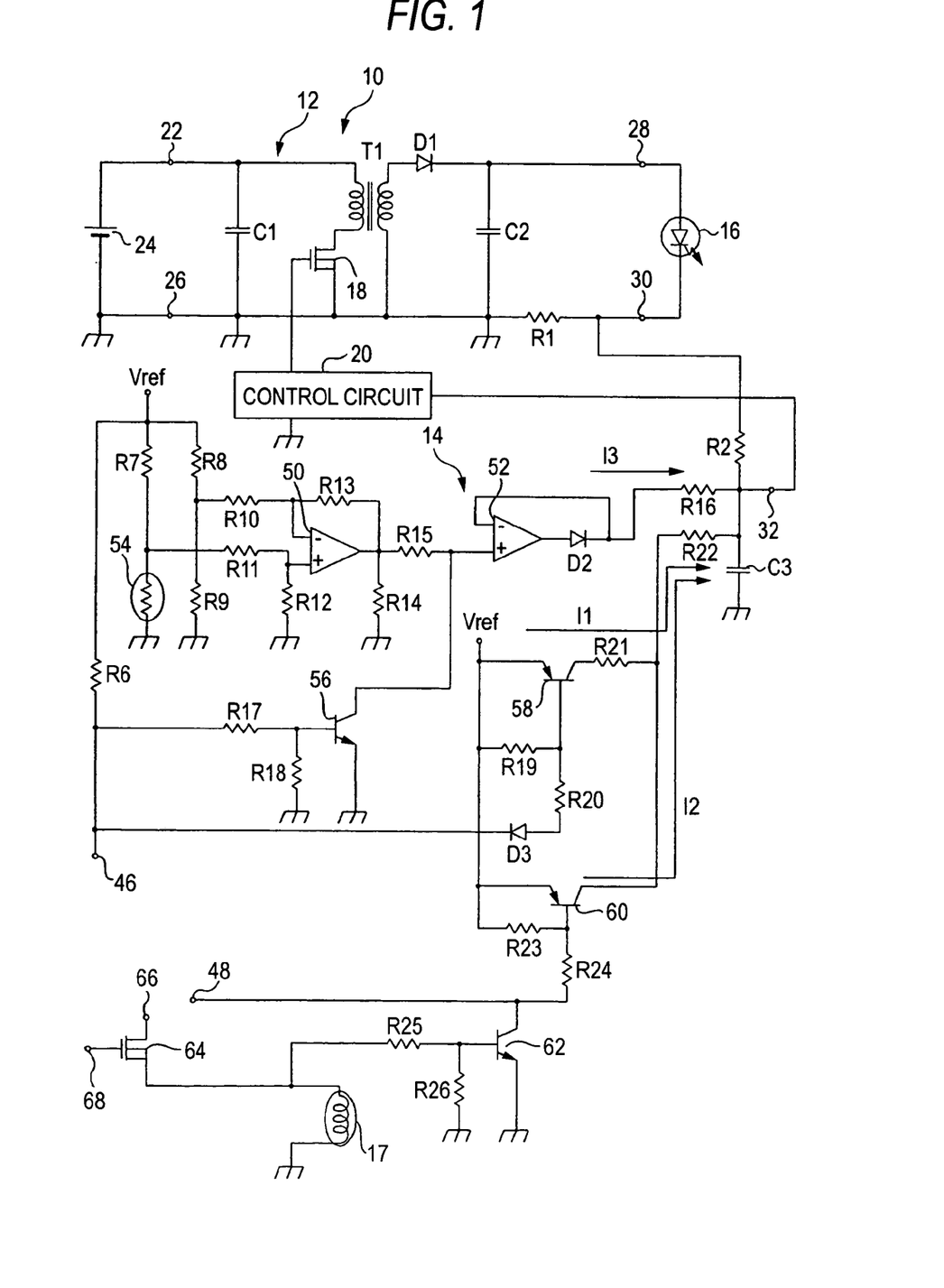
FIG. 1 is a circuit arrangement diagram of a lighting control apparatus of a vehicle-purpose lighting device which show an embodiment of the present invention.
Figure 2:
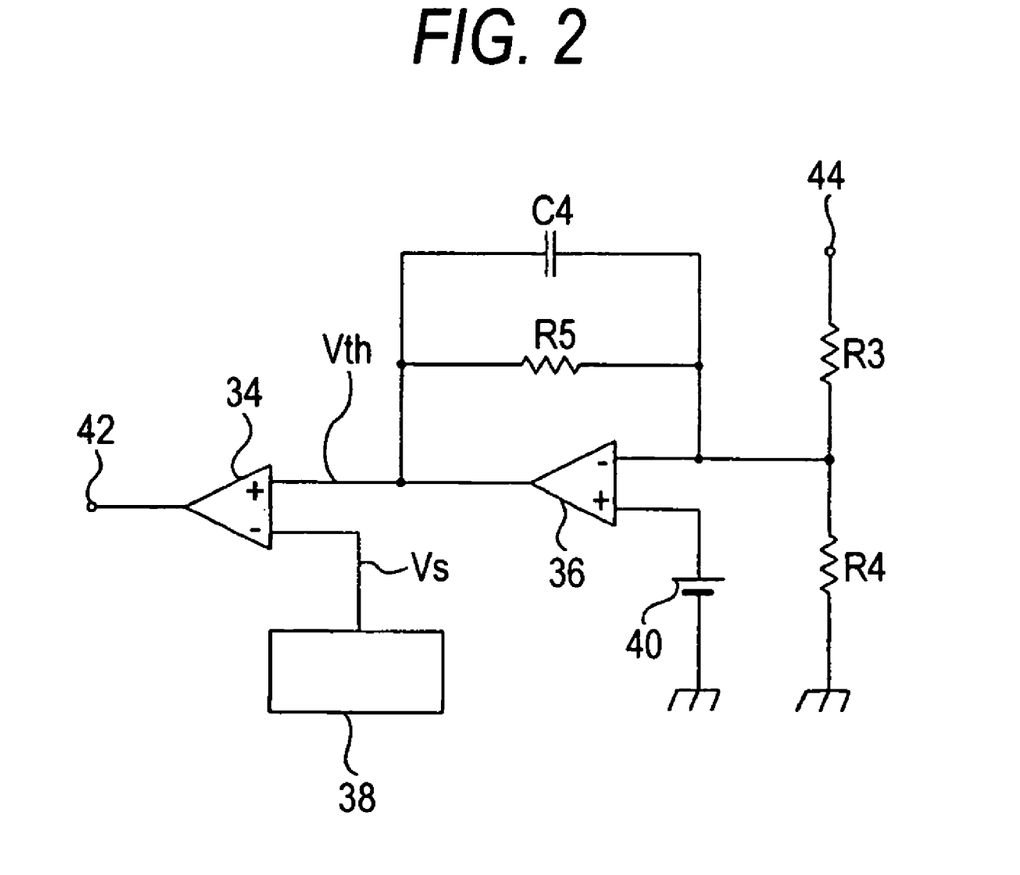
FIG. 2 is a circuit arrangement diagram of a control circuit.
Figure 3:
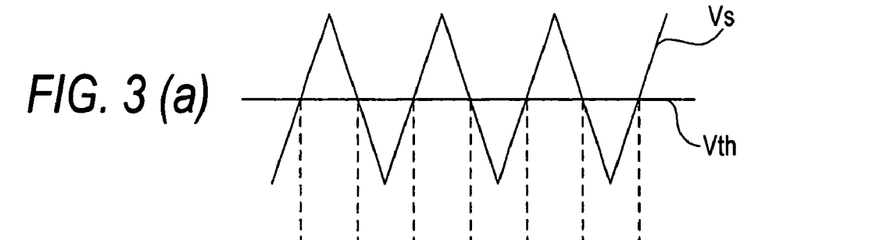
FIG. 3 is a waveform diagram for explaining operations of the control circuit.
Figure 4:
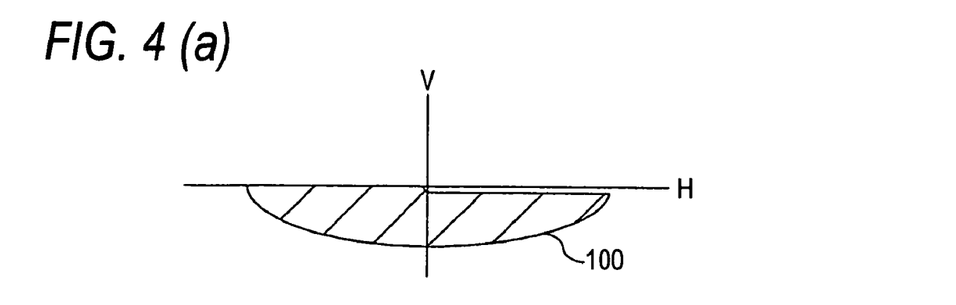
FIG. 4 is a diagram for illustratively showing luminous intensity distribution patterns.
Figure 5:
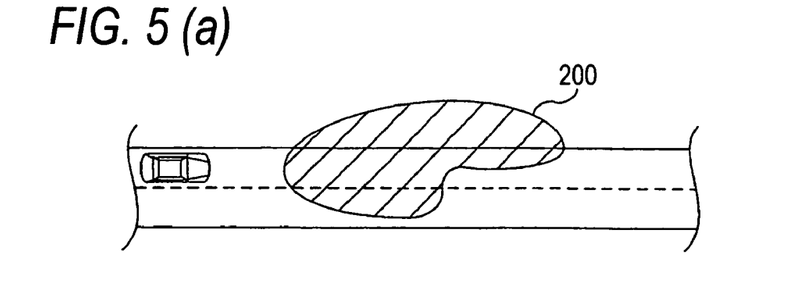
FIG. 5 is a diagram for explaining such conditions that beams are illuminated onto a road surface.

Next, embodiments of the present invention will now be explained with reference to the figures. FIG. 1 is a circuit arrangement diagram of a lighting control apparatus of a vehicle-purpose lighting device which show an embodiment of the present invention. FIG. 2 is a circuit arrangement diagram of a control circuit. FIG. 3 is a waveform diagram for explaining operations of the control circuit. FIG. 4 is a diagram for illustratively showing luminous intensity distribution patterns: FIG. 4(a) is a luminous intensity distribution pattern of a lower beam when a light amount of an entire portion is decreased; FIG. 4(b) is a luminous intensity distribution pattern diagram containing both a lower beam and an upper beam; FIG. 4(c) is a luminous intensity distribution pattern diagram when a light amount of only right and left portions of the lower beam is decreased; and FIG. 4(d) is a luminous intensity distribution pattern diagram when a light amount of only a far portion of the lower beam is decreased. FIG. 5 is a diagram for explaining such conditions that beams are illuminated onto a road surface: FIG. 5(a) is a diagram for explaining a condition that a lower beam when a light amount of an entire portion is decreased is illuminated onto the road surface: FIG. 5(b) is a diagram for showing a condition that both the lower beam and an upper beam are illuminated onto the road surface; FIG. 5(c) is a diagram for representing a condition that the lower beam when a light amount of right and left portions is lowered is illuminated onto the road surface; and FIG. 5(d) is a diagram for representing a condition that the lower beam when a light amount of a far portion is lowered is illuminated onto the road surface.

In these drawings, a lighting control apparatus 10 of a vehicle-purpose lighting device has been arranged by providing a switching regulator 12 and a beam-attenuating control circuit 14 as one element of the vehicle-purpose lighting device (light emitting apparatus). An LED (Light Emitting Diode) 16 has been connected as a load to the switching regulator 12. The LED 16 has been connected parallel to the output side of the switching regulator 12 as a lower beam-purpose semiconductor light source constructed of a semiconductor light emitting element, while this LED 16 has been stored in a lighting chamber in combination with a halogen lamp 17 functioning as an upper beam-purpose light source of a vehicle-purpose head lamp.

As the LED 16, a plurality of light emitting diodes series-connected to each other may be alternatively employed, or a plurality of light emitting diodes parallel-connected to each other may be alternatively used. Also, the LED 16 may be alternatively arranged as light sources of various sorts of vehicle-purpose lighting devices such as a stop and tail lamp, a fog lamp, a turn signal lamp, and the like.

The switching regulator 12 has been arranged by employing a transformer T1, a capacitor C1, an NMOS transistor 18, a control circuit 20, a diode D1, capacitors C2 and C3, a shunt resistor R1, and a resistor R2. The capacitor C1 has been connected parallel to a primary winding side of the transformer T, and the NMOS transistor 18 has been connected series to the primary winding side thereof. One terminal side of the capacitor C1 has been connected via a power supply input terminal 22 to a plus terminal of an on-vehicle battery 24, and the other terminal side of the capacitor C1 has been connected via another power supply input terminal 26 to a minus terminal of the on-vehicle battery 24, and also have been grounded. A drain of the NMOS transistor 18 has been connected to the primary winding side of the transformer T1, a source thereof has been grounded, and a gate thereof has been connected to the control circuit 20. The capacitor C2 has been connected parallel to a secondary winding side of the transformer T1 via the diode D1, and a junction point between the diode D1 and the capacitor C2 has been connected via an output terminal 28 to the anode side of the LED 16. One terminal side of the secondary winding side of the transformer T1 has been grounded in combination with one terminal side of the capacitor C2, and also, has been connected via the shunt resistor R1 and an output terminal 30 to a cathode side of the LED 16. The capacitor C3 has been connected series to the output terminal 30 via the resistor R2, and a junction point between the resistor R2 and the capacitor C3 has been connected via a current detecting terminal 32 to the control circuit 20.

In other words, the lighting control apparatus 10 has been designed that a current flowing through the LED 16 is detected by the shunt resistor R1, the capacitor C3 is charged by a voltage produced between both terminals of the shunt resistor R1, and a voltage produced between both the terminals of the capacitor C3 is fed back to the control circuit 20 as a current of the LED 16.

The NMOS transistor 18 has been arranged as a switching element which is turned ON and OFF in response to ON/OFF signals (switching signal) outputted from the control circuit 20. When the NMOS transistor 18 is turned ON, an input voltage from the on-vehicle battery (DC power supply) 24 is stored to the transformer T1 as electromagnetic energy, whereas when the NMOS transistor 18 is turned OFF, the electromagnetic energy stored in the transformer T1 is released to the LED 16 from the secondary winding side of the transformer T1 via the diode D1 to the LED 16.

In other words, the switching regulator 12 has been arranged as an electric power supplying means which converts the input voltage from the on-vehicle battery 24 into the electromagnetic energy, and supplies this electromagnetic energy as electric power to the LED 16. In this case, the switching regulator 12 has been arranged in such a manner that the switching regulator 12 compares a voltage of the current detecting terminal 32 with a predetermined voltage, and controls the output voltage in response to this comparison result.

Specifically, the control circuit 20 for controlling the output voltage of the switching regulator 12 has been constituted by providing, as indicated in FIG. 2, a comparator 34, an error amplifier 36, a saw-tooth wave generator 38, a reference voltage 40, resistors R3, R4, R5, and a capacitor C4. An output terminal 42 of the comparator 34 has been connected to the gate of the NMOS transistor 18, and an input terminal 44 of the control circuit 20 connected to one terminal of the resistor R3 has been connected to the current detecting terminal 32. It should be noted that a preamplifier may be alternatively provided between the output terminal 42 and the gate of the NMOS transistor 18. A voltage which is fed back from the current detecting terminal 32 is applied to the input terminal 44; both the resistors R3 and R4 divide the voltage applied to the input terminal 44; and the voltage obtained from the voltage dividing operation is applied to a negative input terminal of the error amplifier 36. The error amplifier 36 outputs such a voltage as a threshold value "Vth" to a positive input terminal of the comparator 34, while this voltage corresponds to a difference between the voltage applied to the negative input terminal and the reference voltage 40. The comparator 34 acquires a saw-tooth wave "Vs" from the saw-tooth wave generator 38 to the negative input terminal thereof, and compares the acquired saw-tooth wave Vs with a threshold value "Vth", and then, outputs ON/OFF signals in response to this comparison result to the gate of the NMOS transistor 18.

For example, as shown in FIG. 3(a) and FIG. 3(b), it is so designed that when the level of the threshold value Vth is located at a substantially intermediate level of the saw-tooth wave Vs, such an ON/OFF signal whose ON duty is nearly equal to 50% is outputted. On the other hand, when a level of a voltage fed back from the current detecting terminal 32 becomes lower than the reference voltage 40 since the output voltage (current) of the switching regulator 12 is lowered, the level of threshold value Vth is increased by the output of the error amplifier 36, and as indicated in FIG. 3(c) and FIG. 3(d), such an ON/OFF signal whose ON-duty is higher than 50% is outputted from the comparator 34. As a result, an output voltage (current) of the switching regulator 12 is increased.

Conversely, in conjunction with such a fact that the output voltage (current) of the switching regulator 12 becomes high, when a level of a voltage fed back from the current detecting terminal 32 becomes higher than the reference voltage 40 and the level of the threshold value Vth is decreased by the output of the error amplifier 36, as indicated in FIG. 3(e) and FIG. 3(f), such an ON/OFF signal whose ON-duty is lower than 50% is outputted from the comparator 34. As a result, an output voltage (current) of the switching regulator 12 is decreased. It should also be understood that instead of the saw-tooth wave generator 38, a triangular wave generator for generating a triangular wave (triangular wave signal) may be alternatively employed.

On the other hand, the beam-attenuating control circuit 14 has been arranged as a light amount instruction value setting means which inputs information related to either a condition of a vehicle or a lighting operation of a light source, and outputs a signal as a light amount instruction value in response to the content of this input information, for instance, the beam-attenuating control circuit 14 sets a source current, and outputs the set source current to the switching regulator 12. In the case that as the information related to the condition of the vehicle, for example, a signal having a low level is inputted to a input terminal 46 as such an information that a vehicle speed is lower than the predetermined speed value, the beam-attenuating control circuit outputs a source current "I1" to the current detecting terminal 32. It is so assumed that when the vehicle speed becomes zero, the vehicle is under stopping condition.

Also, in the beam-attenuating control circuit 14, when a signal having a low level is inputted to the input terminal 48 as information related to a lighting operation of the light source, for example, as information for indicating that the upper beam-purpose halogen lamp 17 within the head lamp is lighted, a source current "I2" is outputted to the current detecting terminal 32 as the light amount instruction value.

Furthermore, when an ambient temperature reaches a predetermined temperature, the beam-attenuating control circuit 14 outputs a source current "I3" to the current detecting terminal 32 as a light amount instruction value for decreasing a light emitting degree of the LED 16, namely, either a light amount instruction value for decreasing the temperature of the LED 16 lower than, or equal to a setting temperature or a light amount instruction value for limiting the temperature of the LED 16 to the setting temperature.

Specifically, as indicated in FIG. 1, the beam-attenuating control circuit 14 has been arranged by employing an operational amplifier 50; another operational amplifier 52; a thermistor (temperature detecting element) 54; an NPN transistor 56; PNP transistor 58 and 60; diodes D2 and D3; and also resistors R6, R7, R8, R9, R10, R11, R12, R13, R14, R15, R16, R17, R18, R19, R20, R21, R22, R23, and R24.

Regarding the PNP transistor 58, the emitter has been connected to a voltage "Vref"; the base has been connected via the resistor R20 and the diode D3 to the input terminal 46; and the collector has been connected via the resistors R21 and R22 to the current detecting terminal 32. This PNP transistor 58 is turned ON only when the vehicle speed becomes lower than the determined speed value so that the level of the input terminal 46 becomes a low level, whereas the PNP transistor 58 is kept under OFF state when the vehicle speed is at any speeds other than the above-explained speed, namely the level of the input terminal 46 becomes a high level.

In the case that the vehicle speed becomes lower than the predetermined speed value, and thus, the level of the input terminal 46 becomes the low level, so that the PNP transistor 58 is turned ON, a source current I1=(Verf−voltage across both terminals of shunt resistor R1)/(R21+R22) is supplied to the current detecting terminal 32. Assuming now that when a source current is equal to 0, a full lighting status of 100% is defined, this source current I1 corresponds to a "beam-attenuating ratio"=30%, and also, is equal to such a value corresponding to a beam attenuating lighting status of 70% when a full lighting status is performed. That is, this source current I1 has been set to a predetermined luminous intensity distribution, for example, such a value corresponding to a light emitting degree capable of satisfying the luminous intensity distribution standard as to the lower beam, which is defined in the law. In this case, as indicated in FIG. 4(a), although a luminous intensity distribution pattern 100 of the lower beam is the same as the normal luminous intensity distribution pattern (namely, luminous intensity distribution pattern in case of full lighting status), when the LED 16 is lighted under beam-attenuating status of 70%, as represented in FIG. 5(a), such a lower beam 200 whose light amount is entirely lowered is illuminated onto the road surface.

At this time, when a source current flowing through the current detecting terminal 32 is 0, the switching regulator 12 has performed the control operation for lighting the LED 16 under full lighting status (100% lighting). If the source current supplied to the current detecting terminal 32 is increased from 0 to the source current I1, then a voltage across both the terminals of the capacitor C3 is increased. At this time, in order to make the voltage of the current detecting terminal 32 constant, the control circuit 20 executes such a control operation that the current flowing through the shunt resistor R1 is decreased in response to an increase in the source current I1. As a consequence, the LED 16 is lighted under such a condition that the LED 16 is lighted under beam-attenuating condition of 70%.

On the other hand, as to the PNP transistor 60, the emitter has been connected to "Vref"; the base has been connected via the resistor R24 to the input terminal 48; and the collector has been connected via the resistor R22 to the current detecting terminal 32. This PNP transistor 60 is turned ON only when the level of the input terminal 48 becomes a low level in conjunction with a lighting operation of the upper beam-purpose halogen lamp 17, whereas the PNP transistor 60 is kept under OFF state at any lamp operations other than the above-explained lamp operation, namely the level of the input terminal 46 becomes a high level.

The halogen lamp 17 has been connected to a drive circuit which contains resistors R25 and R26; an NPN transistor 62; and an NMOS transistor 64. An emitter of the NPN transistor 62 has been grounded, and a collector thereof has been connected to the input terminal 48. A gate of the NMOS transistor 64 has been connected via a terminal 68 to an upper beam-purpose driver switch (not shown), and a drain thereof has been connected to the plus terminal of the on-vehicle battery 24. When the upper beam-purpose driver switch is turned ON by being manipulated by a car driver, the NMOS transistor 64 is turned ON, so that the upper beam-purpose halogen lamp 17 is lighted, and the NPN transistor 62 is turned ON, and thus, the level of the input terminal becomes a low level.

When the level of the input terminal 48 becomes a low level since the upper beam-purpose halogen lamp 17 is lighted, the PNP transistor 60 is turned ON, so that such a source current I2=(Vref−voltage across both terminals of shunt resistor R1)/R22 is supplied to the current detecting terminal 32. This source current I2 is larger than the source current I1, and has been set to such a beam attenuating ratio, for example, such a current value corresponding to the beam attenuating ratio=50%. This beam attenuating ratio is used to decrease the light emitting degree, as compared with the beam-attenuated lighting operation when the source current I1 flows through the current detecting terminal 32. As a result, when the source current I2 flows through the current detecting terminal 32, the voltage across both the terminals of the capacitor C3 is increased in conjunction with the increase of the source current I2 flowing through the current detecting terminal 32. At this time, in order to make the voltage of the current detecting terminal 32 constant, the control circuit 20 executes such a control operation that the current flowing through the shunt resistor R1 is decreased in response to an increase in the source current I2. As a consequence, the LED 16 is lighted under such a condition that the LED 16 is lighted under beam-attenuating condition of 50%.

A luminous intensity distribution pattern of this case becomes a luminous intensity distribution pattern 102 which is shown in FIG. 4(b), and contains both a luminous intensity distribution pattern of an upper beam and a luminous intensity distribution pattern of a lower beam; and even when the LED 16 is lighted under beam-attenuating condition of 50%, as indicated in FIG. 5(b), such a beam 202 which contains the lower beam and the upper beam, and the light amount of which is increased, is illuminated onto the road surface over a wide range.

It should also be understood that when the upper beam-purpose halogen lamp 17 is lighted while the vehicle is stopped, the source current I2 may flow with a top priority, rather than the source current I1, and thus, the LED 16 is lighted under beam-attenuating condition in accordance with the source current I2.

Also, while the thermistor 54 representative of a positive temperature coefficient has been arranged at a position separated from the LED 16, this thermistor 54 has been arranged in such a manner that the resistance value of the thermistor 54 is increased in accordance with an increase of an ambient temperature. The thermistor 54 subdivides the voltage "Vref" with the resistor R7, and then, applies the subdivided voltage via the resistor R11 to the positive input terminal of the operational amplifier 50. A voltage obtained by subdividing the voltage "Vref" by the resistors R8 and R9 is inputted via the resistor R10 to the negative input terminal of the operational amplifier 50. While the resistor R7 and the resistor R8 have been made based upon the same resistance values, such a resistance value capable of sensing that the temperature of the thermistor 54 reaches a predetermined temperature has been set in relation to the resistance value of the resistor R9.

In other words, while the voltage produced by subdividing the voltage "Vref" by the resistor R7 and the thermistor 54 is applied via the resistor R11 to the positive input terminal of the operational amplifier 50, and the voltage produced by subdividing the voltage "Vref" by the resistor R8 and the resistor R9 is applied via the resistor R10 to the negative input terminal of the operational amplifier 50, when an ambient temperature is lower than, or equal to the predetermined temperature, an output voltage of the operational amplifier 50 becomes 0 V.

On the other hand, when since the ambient temperature is increased, the resistance value of the thermistor 54 is increased and the ambient temperature becomes the predetermined temperature, a voltage of the positive input terminal of the operational amplifier 50 becomes higher than a voltage of the negative input terminal thereof, and thus, a certain amplified voltage in response to the increase of the ambient temperature is outputted from the operational amplifier 50.

That is, when the resistance values of the resistors R7, R8, R9 are sufficiently smaller than those of the resistors R10, R11, R12, such a voltage is outputted as the amplified voltage from the operational amplifier 50, while this voltage is produced by multiplying a difference voltage by R12/R11. This difference voltage is defined between the voltage obtained by subdividing the voltage "Vref" based upon the resistor R7 and the thermistor 54, and the voltage obtained by subdividing the voltage "Vref" based upon the resistor R8 and the resistor R9. As a result, when the ambient temperature becomes higher than the predetermined temperature, the output of the operational amplifier 50 is successively increased in response to the increase of the ambient temperature, while the ratio of R12/R1 is used as an amplification factor. The output of the operational amplifier 50 is directly applied to the positive input terminal of the operational amplifier 52 under such a condition that the NPN transistor 56 is turned OFF.

While a bias voltage has been set to the NPN transistor 56 based upon the resistors R6, R17, R18, when the vehicle is stopped, the NPN transistor 56 is turned OFF only in such a case that the level of the input terminal 46 is a low level, whereas the NPN transistor 56 is turned ON in any cases other than the above-explained case, for instance, the level of the input terminal 46 is a high level under drive condition of the vehicle, and thus, both the output of the operational amplifier 50 and the positive input terminal of the operational amplifier 52 are forcibly grounded.

The operational amplifier 52 has been arranged as a voltage follower in which the output of the operational amplifier 52 is fed back via the diode D2 to the negative input terminal thereof. When the vehicle is stopped (NPN transistor 56 is turned OFF), if a certain amplified voltage is inputted from the operational amplifier 50 to this operational amplifier 52 in conjunction with such a fact that the ambient temperature reaches the predetermined temperature, then the operational amplifier 52 supplies a source current I3=(amplified voltage−voltage across both terminals of shunt resistor R1)/resistor R16 in accordance with this amplified voltage. This source current I3 is changed how degree the ambient temperature is increased with respect to the predetermined temperature. It should also be understood that when this source current I3 is set as the light amount instruction value used to lower the temperature of the LED 16 than, or equal to the set temperature, for example, the operational amplifier 50 is used as a comparator, the signal having the high level is entered to the resistor R16 so as to increase the beam attenuating ratio, so that the temperature of the LED 16 can be lowered than, or equal to the set temperature. Also, when the source current I3 is set as the light amount instruction value for restricting the temperature of the LED 16 to the set temperature, the amplification factor of the operational amplifier 50 and the resistance value of the resistor R16 are properly set, so that the temperature of the LED 16 can be limited to the set temperature.

If the source current I3 is supplied from the operational amplifier 50 to the current detecting terminal 32 and a source current supplied to the current supply terminal 32 is increased from 0 to the source current I3, then the voltage across both the terminals of the capacitor C3 is increased in response to the source current I3. At this time, in order that the voltage of the current detecting terminal 32 is made constant, the control circuit 20 performs such a control operation that the current flowing through the shunt resistor R1 is decreased in response to the increase of the source current D3. As a result, the LED 16 is lighted in the beam-attenuating ratio in response to the ambient temperature.

When the ambient temperature reaches the predetermined temperature while the vehicle is stopped, the light emitting degree of the LED 16 is decreased in accordance with the source current I3 and is lighted under beam-attenuating condition. As a result, the temperature increase of the LED 16 can be suppressed, so that the deterioration of the LED 16 can be prevented and the energy can be saved.

Since the LED 16 is lighted under beam attenuated condition, the temperature of the LED 16 is lowered, and the ambient temperature is lowered, so that the resistance value of the thermistor 54 is lowered. Then, if the output of the operational amplifier 50 becomes 0 V, the source current I3 does not flow through the current detecting terminal 32, so that the beam attenuating degree of the LED 16 is weakened. Thereafter, the LED 16 is brought into the full lighting status, and the ambient temperature is increased. If the ambient temperature reaches the predetermined temperature, then the control circuit 20 performs such a control operation that the LED 16 is again lighted under beam attenuating condition in accordance with the source current I3. As a result, both the ambient temperature and the beam attenuating ratio will become stable at a given time.

On the other hand, when the control operation for lighting the LED 16 based upon the detected temperature of the thermistor 54 under beam attenuating condition is carried out, the vehicle is brought into the drive condition, and if the NPN transistor 56 is turned ON, then the positive input terminal of the operational amplifier 52 is forcibly grounded, and even if the detected temperature of the thermistor 54 reaches the predetermined temperature, the setting operation of the source current I3 by the operational amplifier 52 is prohibited. In this case, when the upper beam-purpose halogen lamp 17 is not lighted, the LED 16 is brought to the full lighting condition. It should also be understood that the thermistor 54 for detecting the ambient temperature may be provided in an internal portion, or an external portion of the lighting control apparatus 10.

In accordance with one or more embodiments, when the vehicle speed is lower than the predetermined value, the LED 16 is lighted under the beam-attenuating condition at 70% of the full lighting operation, whereas when the upper beam-purpose halogen lamp 17 is lighted, the LED 16 is lighted under the beam-attenuating condition at 50% of the full lighting operation. As a consequence, the above-explained lighting operations of the LED 16 can contribute the energy saving effect and the prevention of the deterioration of the LED 16, and the driving safety characteristics can be maintained.

Also, while the vehicle is stopped, even when the LED 16 is lighted under the beam-attenuating condition of 70%, if the ambient temperature reaches the predetermined temperature, then the LED 16 is furthermore lighted under the beam-attenuating condition. As a result, the temperature increase of the LED 16 can be suppressed, so that the LED 16 can be protected. On the other hand, when the vehicle speed becomes higher than the predetermined value, or when the vehicle is operated under drive condition, lowering of the light emitting degree of the LED 16 is prohibited in order to bring the LED 16 to the full lighting condition, so that the driving safety characteristics can be maintained at a top priority.

When the ambient temperature reaches the predetermined temperature, the LED 16 is lighted under the beam-attenuating condition in response to the ambient temperature. As a result, while the temperature increase of the LED 16 can be suppressed, the deterioration of the LED 16 can be avoided and this can contribute the long lifetime of the LED 16.

In other words, if the lighting condition of the LED 16 is continued under burning sun in mid-summer time, or under idle state, there are such risks that the LED 16 is deteriorated and the lifetime of the LED 16 is adversely influenced, namely even when the LED 16 is lighted under beam-attenuating condition during the idle state (during vehicle stopping condition), if this condition is continued for a long time, then the above-explained risk may occur. However, even when the LED 16 is lighted under beam-attenuating condition, in such a case that the ambient temperature reaches the predetermined temperature, the LED 16 is furthermore brought into the beam-attenuating lighting condition. As a result, the temperature increase of the LED 16 is suppressed, so that the LED 16 can be protected.

In this case, if a temperature sensor for sensing the ambient temperature is installed at the external portion of the lighting control apparatus 10, then a member for mounting the temperature sensor and harness for connecting this temperature sensor with the lighting control apparatus 10 are required, and a mounting work step is increased, so that the cost is increased.

In contrast to the above-explained cost-increase aspect, considering such an experimental fact that the temperature of the LED 16 and the temperature within the lighting control apparatus 10 are under thermal saturation condition and have a correlative relationship, the thermistor 54 is installed within the lighting control apparatus 10 as the temperature sensor, and the LED 16 is lighted under beam-attenuating condition in such a manner that the temperature within the lighting control apparatus 10 is limited based upon the detected temperature of the thermistor 54. As a result, the deterioration of the LED 16 and the adverse influence given to the lifetime thereof can be suppressed.

Also, in the case that heat dissipation of the LED 16 is designed, such a condition that the ambient temperature reaches such a risky temperature at which the LED 16 is deteriorated even if the LED 16 is lighted under the beam-attenuating condition of 70% is made coincident with the condition that the ambient temperature reaches the predetermined temperature. As a result, the heat dissipation can be easily designed, which can contribute the cost reduction and also can minimize lowering of the safety characteristics, since the above-described condition corresponds to such a condition under which the vehicle is stopped in day time.

In the case that the light amount of the LED 16 is decreased up to such a degree at which the predetermined luminous intensity distribution can be satisfied, the light amount related to the luminous intensity distribution may be entirely lowered (namely, all of plural LEDs may be turned under beam-attenuating condition), or only a light amount related to a portion (far portion, right/left portions) of the luminous intensity distribution may be alternatively reduced (namely, only preselected number of LEDs within plural LEDs may be lighted under beam-attenuating condition).

For instance, when the light amount as to only the right/left portions is lowered, as shown in FIG. 4(*c*), a luminous intensity pattern 104 is employed in addition to the luminous intensity pattern 100. Also, when the light amount as to only the far portion is lowered, as shown in FIG. 4(*d*), a luminous intensity pattern 106 is employed in addition to the luminous intensity pattern 100. When the LED 16 is lighted under the beam-attenuating condition in accordance with both the luminous intensity pattern 100 and the luminous intensity pattern 104, as illustrated in FIG. 5(*c*), such a lower beam 204 whose light amount is lowered is illuminated to the right/left portions of the lower beam 200 on the road surface. Also, when the LED 16 is lighted under the beam-attenuating condition in accordance with both the luminous intensity pattern 100 and the luminous intensity pattern 106, as illustrated in FIG. 5(*d*), such a lower beam 206 whose light amount is lowered is illuminated to the far portion of the lower beam 200 on the road surface.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS AND SIGNS 10 lighting control apparatus of vehicle-purpose lighting device
12 switching regulator
14 beam-attenuating control circuit
16 LED
18 NMOS transistor
20 control circuit
34 comparator
36 error amplifier
38 saw-tooth wave generator
50, 52 operational amplifier
54 thermistor
56 NPN transistor
58, 60 PNP transistor

What is claimed is:

1. A lighting control apparatus of a vehicle-purpose lighting device comprising:
light amount instruction value setting means to which information related to either a status of a vehicle or a lighting operation of a light source is inputted, the light amount instruction value setting means setting a light amount instruction value based on said information; and
electric power supplying means for supplying an input voltage from a power supply to a lower beam-purpose semiconductor light source in accordance with said light amount instruction value, wherein:
when information for indicating that a vehicle speed is lower than a predetermined speed value is inputted to said light amount instruction value setting means, said light amount instruction value setting means sets a light amount instruction value by which said lower beam-purpose semiconductor light source is lighted under beam-attenuating condition up to a light emitting degree capable of satisfying a predetermined luminous intensity distribution; and
when information for indicating that an upper beam-purpose light source is lighted is inputted to said light amount instruction value setting means, said light amount instruction value setting means sets a light amount instruction value such that a light emitting degree is lowered from that of said beam-attenuating lighting operation so as to light said lower beam-purpose semiconductor light source under beam-attenuating condition;
said light amount instruction value setting means includes a temperature detecting element for detecting an ambient temperature; and
when a temperature detected by said temperature detecting element reaches a predetermined temperature, said light amount instruction value setting means sets a light amount instruction value used to decrease the temperature of said lower beam-purpose semiconductor light source lower than, or equal to, a setting temperature, or sets a light amount instruction value used to restrict the temperature of said lower beam-purpose semiconductor light source to said setting temperature, which correspond to light amount instruction values used to reduce a light emitting degree of said lower beam-purpose semiconductor light source, and outputs any one of said set light amount instruction values to said electric power supplying means.

2. A lighting control apparatus of a vehicle-purpose lighting device as claimed in claim 1 wherein:
said light amount instruction value setting means sets a light amount instruction value when the temperature detected by said temperature detecting element reaches the predetermined temperature under such a condition that the information for indicating that said vehicle speed is lower than the predetermined speed value has been set; and
said light amount instruction value setting means prohibits setting of the light amount instruction amount when the temperature detected by said temperature detecting element reaches the predetermined temperature under such a condition that the information for indicating that said vehicle speed is lower than the predetermined speed value has not been set.

3. A lighting control apparatus of a vehicle-purpose lighting device comprising:
a semiconductor lower beam-purpose light source powered by an input voltage from an electric power supply; and
control circuitry that changes an amount of the input voltage of the semiconductor lower beam-purpose light source based on control information,
wherein the control information comprises:
a lighting state of an upper beam purpose light source and a status of the vehicle, and
wherein the control circuitry decreases the amount of the input voltage of the semiconductor lower beam-purpose light source based on the control information of the lighting state of the upper beam-purpose light source when the lighting state of the upper beam-purpose light source indicates that the upper beam-purpose light source is lighted; and
the control circuitry decreases the amount of the input voltage based on the control information of the status of the vehicle when the status of the vehicle indicates a vehicle speed lower than a predetermined speed value.

4. The lighting control apparatus of claim 3, wherein the control information further comprises an ambient temperature and the control circuitry decreases the amount of the input voltage based on the control information of the ambient temperature when the ambient temperature is above a predetermined temperature value.

5. The lighting control apparatus of claim 4, wherein the control circuitry only decreases the amount of the input voltage based on the control information of the ambient temperature when the ambient temperature is above a predetermined temperature value when the control information of the status of the vehicle when the status of the vehicle indicates a vehicle speed lower than a predetermined speed value.

* * * * *